United States Patent [19]

Read

[11] Patent Number: 4,944,538

[45] Date of Patent: Jul. 31, 1990

[54] THREADED PIPE JOINT HAVING IMPROVED SEAL RING ENTRAPMENT

[75] Inventor: Shannon R. Read, Houston, Tex.

[73] Assignee: Baroid Technology, Inc., Houston, Tex.

[21] Appl. No.: 320,476

[22] Filed: Mar. 8, 1989

[51] Int. Cl.⁵ .............................................. F16L 25/00
[52] U.S. Cl. ..................................... 285/334; 285/351
[58] Field of Search ...................... 285/333, 334, 332.3, 285/351

[56] References Cited

U.S. PATENT DOCUMENTS

| | | |
|---|---|---|
| 2,980,451 | 3/1966 | Taylor et al. . |
| 3,047,316 | 3/1986 | Wehring et al. . |
| 3,054,628 | 2/1985 | Hardy et al. . |
| 3,314,696 | 4/1967 | Ferguson et al. ............ 285/332.3 X |
| 4,598,455 | 7/1986 | Morris ............... 285/334 X |
| 4,610,467 | 9/1986 | Reimert .......................... 285/334 X |
| 4,671,544 | 6/1987 | Ortloff .................................. 285/334 |

Primary Examiner—Dave W. Arola
Attorney, Agent, or Firm—Browning, Bushman, Anderson & Brookhart

[57] ABSTRACT

The box end of a threaded joint has an interior profile of an inwardly tapered threaded section, followed by a smooth sealing surface parallel to the longitudinal axis of the threaded joint, followed by an increased diameter seal ring groove, followed by an inwardly tapered smooth sealing surface. The pin end of the joint has an external torque shoulder, followed by an inwardly tapered threaded section, followed by a reduced diameter pipe dope reservoir, followed by an extrusion hump used to extrude a deformable seal ring used in the seal ring groove, followed by an inwardly tapered smooth sealing surface. When the threaded joint is fully made up, the entrapped seal ring has a primary metal-to-metal seal on its one side, formed by the mated smooth, tapered surfaces, and a secondary metal-to-metal seal formed by the extrusion hump and the surface above the seal ring groove.

4 Claims, 3 Drawing Sheets

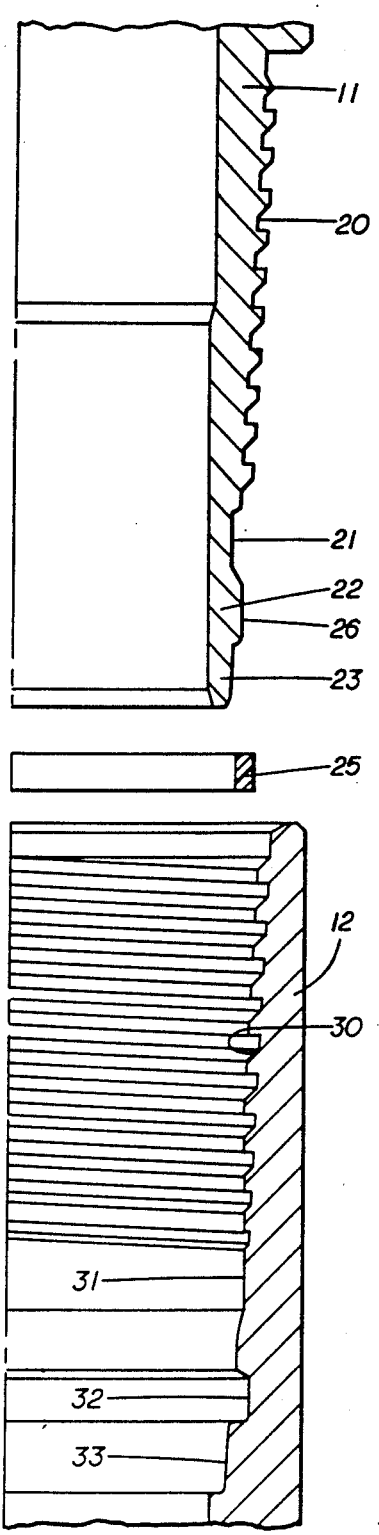
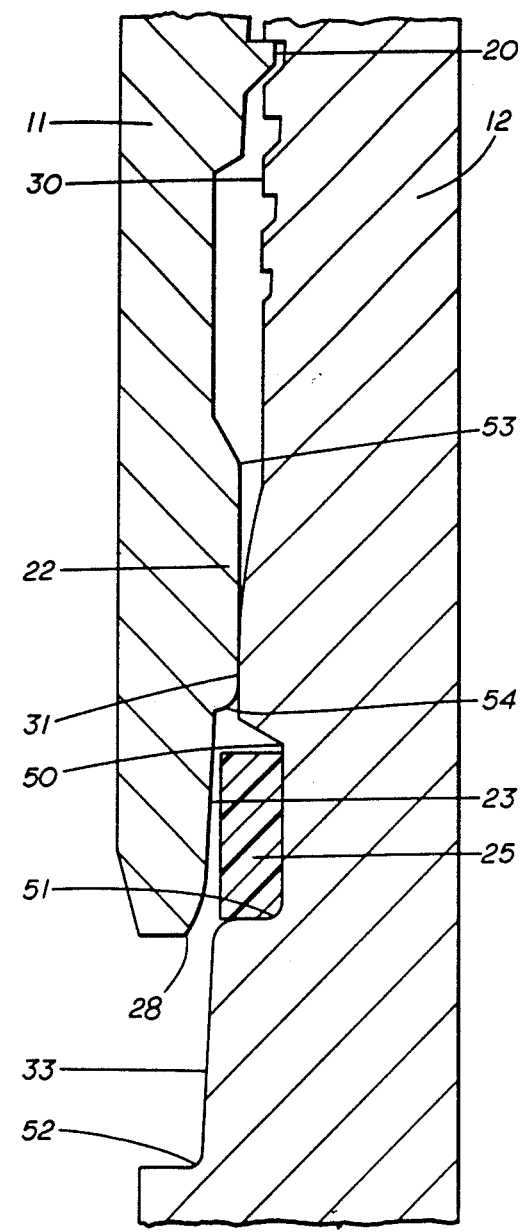
FIG. 2
FIG. 3

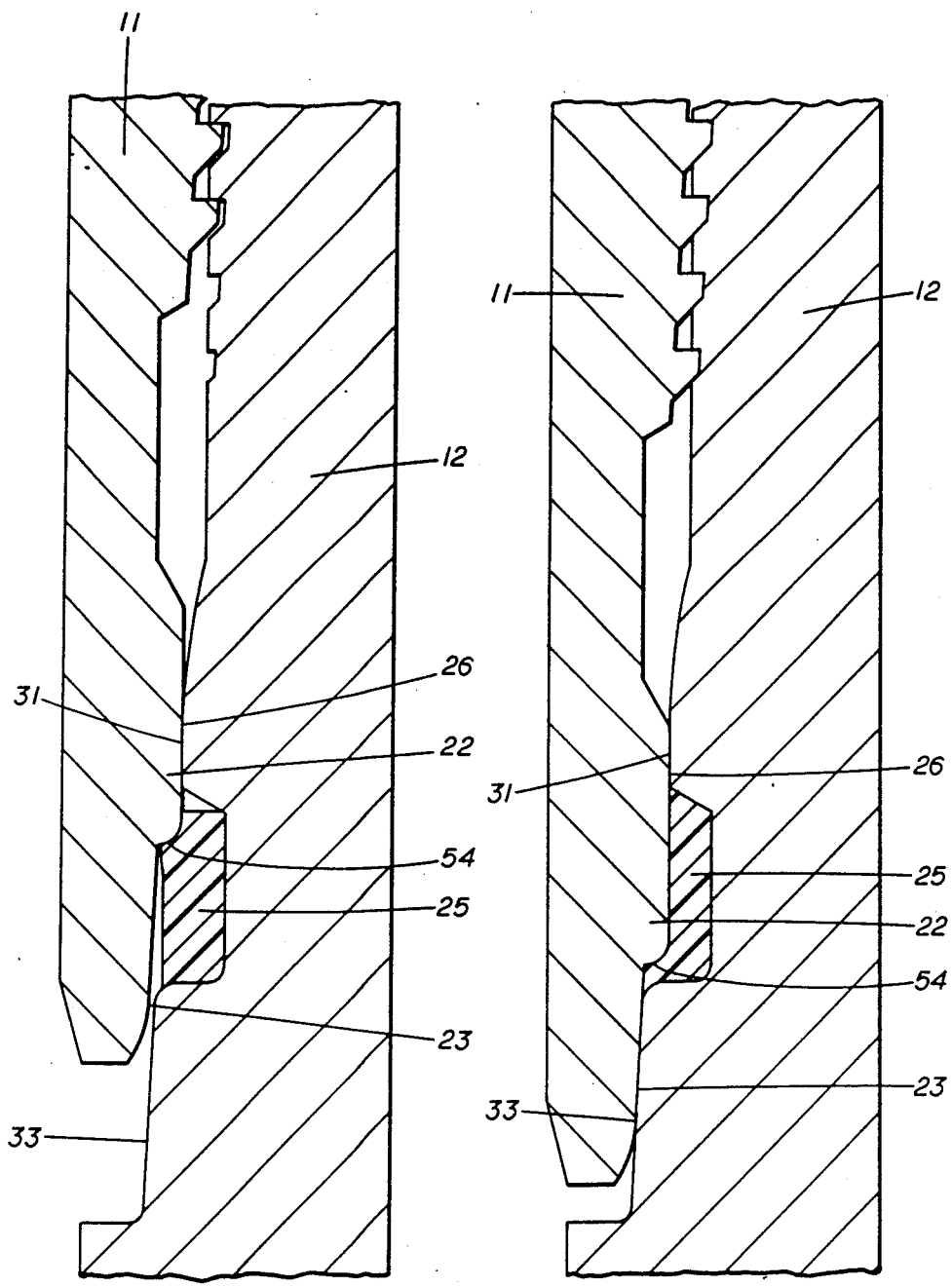

THREADED PIPE JOINT HAVING IMPROVED SEAL RING ENTRAPMENT

BACKGROUND OF THE INVENTION

This invention relates generally to threaded joints, and more particularly to threaded connections between sections of casing, tubing or drill pipe used in oil and gas wells.

In the drilling of oil, gas and like wells, it is customary to drill to the desired formation or formations, cement casing in place in the well bore and provide tubing extending downwardly in the well bore from the surface inside the casing, the annular space between the casing and tubing being packed off by a packer; although, many wells are produced without a packer. Ordinarily, the casing is perforated at the face of the formation or is set above the formation traversed by the well bore and a section of tail pipe is provided below the packer. The tail pipe may be perforated or slotted or open-ended so that, ordinarily, pore fluid from the formation flows into the well bore, such as through the perforations in the casing or below the casing and into the interior of the well bore into tubing or casing up to the surface or is pumped therethrough. In some instances, the flow is in the annular space between the tubing and the casing such, as for example, in the case of dual or multiple completions where one formation is being produced in the tubing and another formation is being produced in the annular space between the tubing and the casing.

In producing oil, gas and like wells, particularly in those wells under high pressure, joints in the tubing sometimes fail and permit oil, gas and the like to leak through the tubing into the annular space which provides a high pressure on the casing at the surface, which is the weakest point of the various strings of pipe positioned in the well bore. These leaking joints are ordinarily caused due to the failure to obtain a satisfactory seal, such as caused by normal wear and tear, improper machining and, in those joints utilizing packing, by the corrosive action of the fluid in the well bore.

It is well known in the tubing and casing arts to use a polymerized tetrafluoroethylene packing or sealing ring to assist in the sealing off of the high pressures encountered in oil and gas wells.

For example, U.S. Pat. No. 3,054,628, assigned to the assignee of the present application, shows such a ring slipped over the lower end of the pin member, and which is deformed against the tapered surface of the box member.

U.S. Pat. No. 3,047,316, assigned to the assignee of the present application, shows a seal ring engaged by the threads of the pin member, causing a portion of the seal ring to be forced into the entrance between the first two full height threads to seal the passage.

U.S. Pat. No. 2,980,451, assigned to the assignee of the present application, shows an annular groove intermediate the thread ends on either the pin member or the box member, with the seal member seated in the groove. As the threads are made up, the seal member is extruded into the threaded section adjacent the annular groove.

Although each of the foregoing prior art designs has enjoyed considerable commercial success, there has arisen the need for more uniform sealing when extruding the seal ring. The designs using the seal entrapped within the threads, in particular, sometimes experience non-uniform extrusion, and, thus, non-uniform sealing.

These same designs having the seal ring extruding into the threads also have had only a single metal-to-metal seal on one end of the entrapped seal, with the thread form on the other end of the entrapped seal ring.

It is therefore the primary object of the present invention to provide a new and improved threaded pipe joint having improved uniformity of seal ring entrapment.

It is yet another object of the present invention to provide a new and improved threaded pipe joint having the extruded seal ring completely entrapped by two metal-to-metal seals.

It is still another object of the invention to provide a new and improved threaded pipe joint which includes engagement means designed to decrease the likelihood of seal damage during makeup of the threaded joint.

SUMMARY OF THE INVENTION

The primary object of the invention is accomplished, generally, by the provision of a box member having an inwardly tapered threaded section on its inner periphery and an enlarged diameter, seal ring entrapment area below said inwardly tapered threaded section, a deformable seal ring in said entrapment area, a pin member having an inwardly tapered threaded section on its outer periphery adapted to threadably engage the threaded section of said box member, and having an enlarged diameter, extrusion hump sized to engage and deform the deformable seal ring, thereby creating a uniform, high pressure seal between the box member and the pin member.

Another object of the invention is accomplished, generally, by the provision of the extrusion hump being sized to provide a first metal-to-metal seal on one side of the entrapped seal, while the primary metal-to-metal seal is located on the other side of the entrapped seal.

Yet another object of the invention is accomplished, generally, by the extrusion hump being sized to contact the inner periphery of the box member prior to the engagement of the primary metal-to-metal seal, thereby aligning the primary metal-to-metal sealing surfaces and decreasing the aspect of seal damage otherwise resulting from misalignment.

These and other objects, features and advantages will become apparent from the following detailed description taken in conjunction with the accompanying drawings.

BRIEF DESCRIPTION OF THE DRAWINGS

FIG. 2 is an elevated, exploded view, partly in cross-section, of a pin member, deformable seal ring and box member according to the present invention, prior to the makeup of the threaded joint.

FIG. 3 is an elevated, cross-sectional view of the pin member and box member according to the present invention, during makeup of the threaded connection but prior to the extrusion hump first contacting the deformable seal member.

FIG. 4 is an elevated, cross-sectional view of the pin and box members of FIG. 3, during makeup of the threaded connection shortly after the extrusion hump first contacts the deformable seal member.

FIG. 5 is an elevated, cross-sectional view of the pin and box members of FIG. 3, wherein the extrusion hump has completed the extrusion of the deformable seal member in accordance with the present invention.

DETAILED DESCRIPTION OF THE PREFERRED EMBODIMENTS

Figure 1:
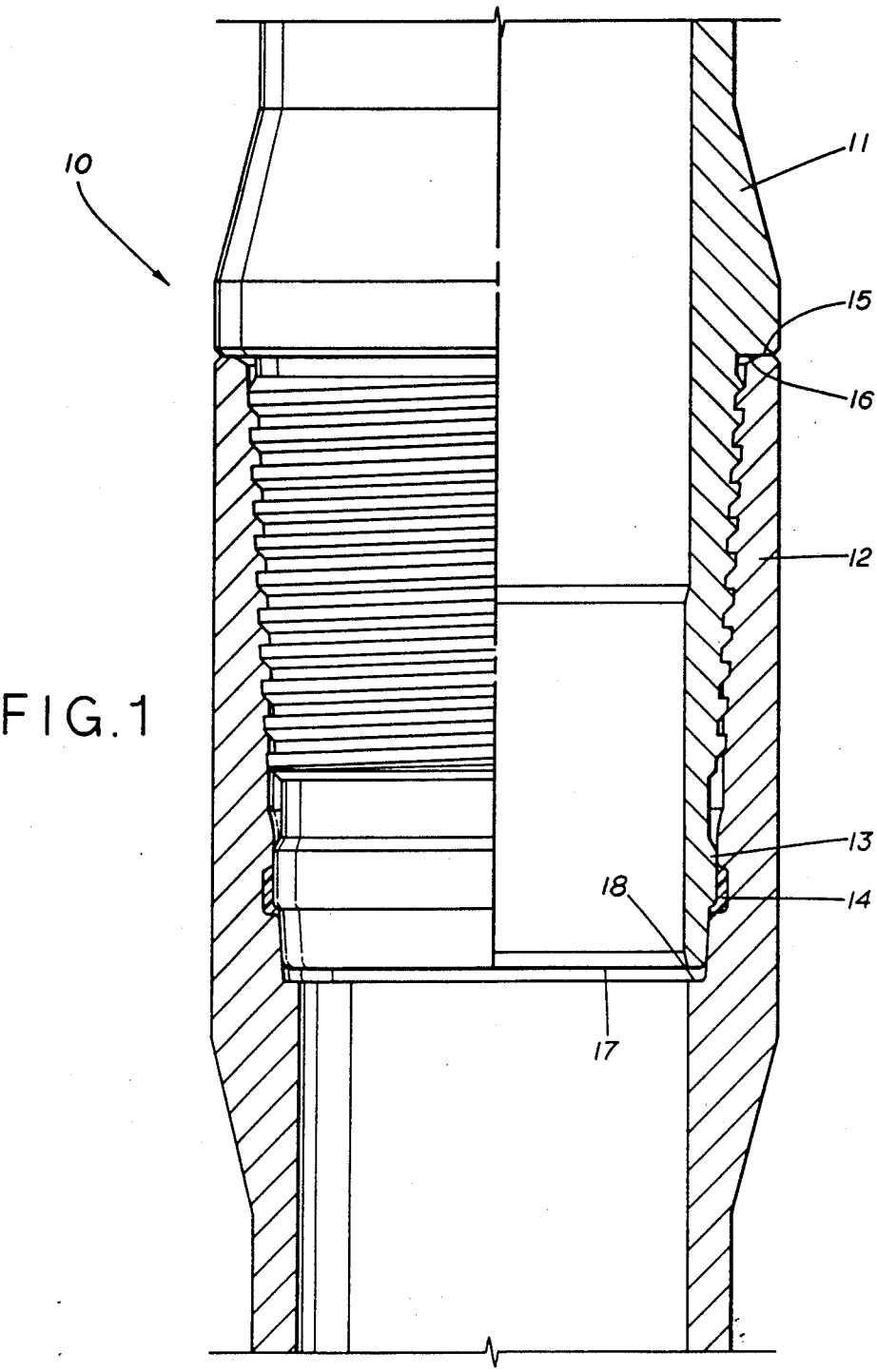
FIG. 1 is an elevated view, partly in cross-section, of a madeup threaded joint according to the present invention.

Referring now to the drawings in more detail, especially to FIG. 1, there is illustrated an elevational view, partly in cross-section, of a threaded joint 10 according to the present invention, comprised of a pin member 11 and a box member 12. The pin member 11 has an extrusion hump 13 which has caused the deformable seal ring 14 to be deformed into a sealing arrangement between the pin member 11 and the box member 12, all of which is described in greater detail hereinafter.

Referring now to FIG. 2, the pin member 11 of FIG. 1 is illustrated and described in greater detail. The pin member 11 includes an inwardly tapered thread 20 on its outer periphery having a reduced diameter section 21 below the end of the thread 20 which is used as a dope reservoir. Immediately adjacent the dope reservoir 21 is an extrusion hump 22 having an increased diameter as compared to the diameter of the dope reservoir 21. Immediately below the extrusion hump 22 is a pin end 23 whose outer surface serves as the primary metal-to-metal seal when engaged with the surface 33 of box member 12.

FIG. 2 also illustrates a deformable seal ring 25 which is formed, in a preferred embodiment, of polymerized tetrafluoroethylene. The manufacturer of this material is E.I. DuPont Nemours and Co. under the trade name "Teflon".

Referring further to FIG. 2, the box member 12 is illustrated in greater detail. The box member 12 has an inwardly tapered thread 30 on its inner periphery designed to match the thread 20 on the outer periphery of the pin member 11. Immediately below the lower end of the threaded section 30 is a smooth surface 31 sized and positioned to form a secondary metal-to-metal seal with the outer surface 26 of the extrusion hump 22. Below the surface 31 of the inner periphery of the box member 12 is an enlarged diameter section 32 for retaining the deformable seal member 25 as is illustrated in greater detail in FIG. 3 hereinafter. Still further below the sealing ring retention portion 32 is a smooth surface 33 which forms the primary metal-to-metal seal when engaged with the surface of the lower pin member 23.

Referring now to FIG. 3, the pin member 11 is illustrated as being partially madeup with the box member 12 such that the threaded section 20 of the pin member 11 has engaged some of the threads 30 of the box member 12. As illustrated, the extrusion hump 22 at this stage in the makeup process has engaged the sealing surface 31, but has yet to engage the deformable sealing ring 25. At this point in the process, the surface of pin end 23 and surface 33 have not yet engaged to form the primary metal-to-metal seal. The manufacturing process in accordance with the preferred embodiment of the present invention contemplates the extrusion hump 22 being machined on an axis parallel to the longitudinal axis of the threaded joint while the primary metal-to-metal seal is machined on a taper to the longitudinal axis of the threaded joint. By machining the extrusion hump parallel to the threaded joint axis, this necessarily allows the extrusion hump 22 to make contact with the surface 31 before the primary metal-to-metal surfaces are engaged. This then allows the primary metal-to-metal surfaces to be guided together without damage which can occur due to misalignment of the pin member with the box member. By having the extrusion hump 22 contact the surface 31 prior to the primary metal-to-metal surfaces coming together, there is a decrease of the the probability of high angle cocking of the pin member 11. As another way of expressing this relationship, the initial contact of the extrusion hump 22 with the surface 31 does not prevent cocking of the pin member, but lessens the angle of cocking to thus reduce the probabililty of damage to the primary metal-to-metal seal. If it were not for this feature, the pin member 11 can easily become cocked such that the point 28 of the pin member can dig into the surface 33 and cause damage to the seal.

Referring now to FIG. 4, following additional makeup of the joint, the extrusion hump 22 is illustrated as having now contacted the seal ring 25 which causes a partial deformation of the seal ring 25.

FIG. 5 illustrates the complete makeup of the threaded joint such that the seal ring 25 is completely deformed in accordance with the present invention and the primary metal-to-metal sealing surfaces 23, 33 are engaged. It should also be appreciated that the surface 26 of extrusion hump 22 forms a secondary metal-to-metal seal with the surface 31 of the box member. Thus, there is a primary metal-to-metal seal on one side of the deformed seal ring 25 and a secondary metal-to-metal seal on the upper side of the deformed seal ring 25.

In order to improve the control of the machining of the seal ring entrapment area 32, the extrusion hump 22 and the seal ring retention groove 32, with its two adjacent sealing surfaces 31, 33, are machined with the same tool. Although the dimensions will vary with different size casing, tubing, drill pipe, or the like, in a 5" casing made in accordance with the present invention, the dope reservoir 21 is cut to a diameter of 4.264". The extrusion hump 22 is cut to a diameter of 4.362" and has a length between points 53 and 54, as illustrated in FIG. 3, of 0.300". The seal ring groove 32 has a diameter of 4.402" and has a length between points 50 and 51, also illustrated in FIG. 3, of 0.250". The surface 31, also machined parallel to the longitudinal axis of the threaded joint, has a diameter of 4.356". Thus, the extrusion hump 22, with its diameter of 4.362", forms an interference fit with the surface 31, helping to prevent cocking of the pin member 11. The surface 33, having a length of 0.400", has a taper of 1⅛" per foot and has a diameter at point 52 of 4.244". The surface of pin end 23 has a matching taper.

The groove 21 above the extrusion hump 22, having a reduced diameter, acts as a resevoir to allow entrapped thread lubricants to flow therein. In typical prior art threaded connections, the thread lubricants would be trapped between the external torque shoulder and the primary metal-to-metal seal with no place to flow, resulting in an increase of the stresses in the connection.

Referring again to FIG. 1, it should be appreciated that in the preferred embodiment of the present invention, the torque shoulder is comprised of the upper surface 15 of the box member 12 being torqued against the shoulder 16 of the pin member. As an alternative embodiment, if desired, the lower end 17 of pin member 11 can be torqued against the shoulder 18 within the interior of the box member 12.

In view of the foregoing, it will be seen that by this invention a threaded joint has been produced which has greatly improved sealing characteristics for operations in high pressure oil and gas wells, or the like. The features of this invention can be used with casing, tubing, drill pipe, and the like, although the preferred embodiment contemplates manufacture and utilization of well casing.

What is claimed is:

1. A threaded, sealed joint comprising:
   (a) a box member having a first inwardly tapered threaded section on its inner periphery, an enlarged diameter seal ring groove below the lower end of said first inwardly tapered threaded section, a deformable seal ring in said seal ring groove, and a first smooth, inwardly tapered surface on said inner periphery below said seal ring groove; and
   (b) a pin member having a second inwardly tapered threaded section on its outer periphery, an extrusion hump having a given diameter below the lower end of said second threaded section, said pin member having an area between the lower end of said second threaded section and the extrusion hump of a diameter less than the said given diameter of said extrusion hump and a second smooth, inwardly tapered surface on said outer periphery below and immediately adjacent to said extrusion hump having its greatest diameter less than the said given diameter of said extrusion hump, whereby upon makeup of the joint, the said extrusion hump entraps the said seal ring into sealing engagement between the box member and the pin member, and a primary metal-to-metal seal is formed between said first and second inwardly tapered smooth surfaces.

2. The threaded, sealed joint according to claim 1, including in addition thereto, a third smooth surface between the lower end of the first threaded section and the seal ring groove, and a fourth smooth surface on the outer periphery of the extrusion hump, such third and fourth surfaces forming a secondary metal-to-metal seal upon makeup of the joint.

3. The threaded, sealed joint according to claim 2, wherein each of said third and fourth smooth surfaces are parallel to the longitudinal axis of the joint.

4. The threaded, sealed joint according to claims 1, 2 or 3 wherein said deformable seal ring is comprised of polymerized tetrafluoroethylene.

* * * * *